United States Patent
Ulbrich-Gasparevic et al.

(10) Patent No.: US 8,297,553 B2
(45) Date of Patent: Oct. 30, 2012

(54) EQUIPMENT ELEMENT WITH RETRACTABLE LINE

(75) Inventors: Jovan Ulbrich-Gasparevic, Pinneberg (DE); Michael Mosler, Plaisance du Touch (FR)

(73) Assignee: Airbus Operations GmbH, Hamburg (DE)

(*) Notice: Subject to any disclaimer, the term of this patent is extended or adjusted under 35 U.S.C. 154(b) by 241 days.

(21) Appl. No.: 12/764,802

(22) Filed: Apr. 21, 2010

(65) Prior Publication Data

US 2010/0270429 A1    Oct. 28, 2010

Related U.S. Application Data

(60) Provisional application No. 61/172,351, filed on Apr. 24, 2009.

(30) Foreign Application Priority Data

Apr. 29, 2009  (DE) .......................... 10 2009 018 771

(51) Int. Cl.
*B64D 11/00*    (2006.01)
(52) U.S. Cl. ................. 244/118.5; 244/129.1; 191/12 R
(58) Field of Classification Search ............... 244/118.1, 244/118.5, 129.1, 131, 117 R; 191/12 R, 191/12.2 R, 12.4
See application file for complete search history.

(56) References Cited

U.S. PATENT DOCUMENTS

| | | | |
|---|---|---|---|
| 6,016,016 A * | 1/2000 | Starke et al. | 307/9.1 |
| 6,282,289 B1 * | 8/2001 | James et al. | 379/446 |
| 6,324,285 B1 * | 11/2001 | Dowsett et al. | 379/455 |
| 6,597,788 B2 * | 7/2003 | James et al. | 379/446 |
| 6,604,711 B1 * | 8/2003 | Stevens et al. | 244/135 A |
| 6,626,275 B2 * | 9/2003 | Lee | 191/12 R |
| 6,942,079 B2 * | 9/2005 | Chang | 191/12.4 |
| 7,172,155 B2 | 2/2007 | Feist et al. | |
| 2005/0098405 A1 * | 5/2005 | Chang | 191/12.2 R |
| 2005/0224624 A1 | 10/2005 | Park | |
| 2007/0262185 A1 | 11/2007 | Burke et al. | |
| 2008/0034630 A1 | 2/2008 | Horst et al. | |
| 2011/0024566 A1 * | 2/2011 | Soenarjo | 244/131 |

FOREIGN PATENT DOCUMENTS

| | | |
|---|---|---|
| DE | 200 13 686 U1 | 9/2000 |
| DE | 20 2004 008 816 U1 | 11/2004 |
| DE | 10 2006 012 203 B4 | 12/2007 |
| DE | 20 2008 014 154 U1 | 2/2009 |
| DE | 10 2007 062 193 A1 | 7/2009 |
| WO | WO 90/02582 A1 | 3/1990 |
| WO | WO 95/29552 A1 | 11/1995 |

* cited by examiner

*Primary Examiner* — Benjamin P Lee
(74) *Attorney, Agent, or Firm* — Ingrassia Fisher & Lorenz P.C.

(57) ABSTRACT

An equipment element for transportation means, in particular an airplane, includes, but is not limited to a retractable line, the length of which can be set using a retraction mechanism.

20 Claims, 4 Drawing Sheets

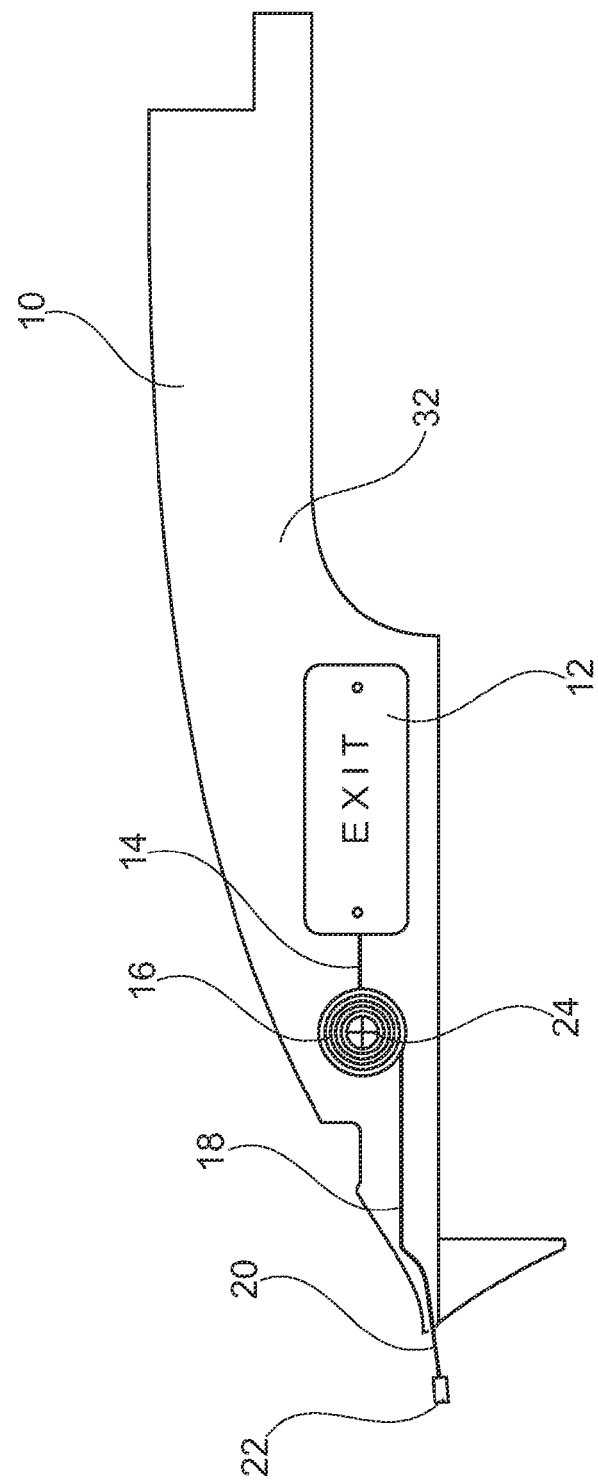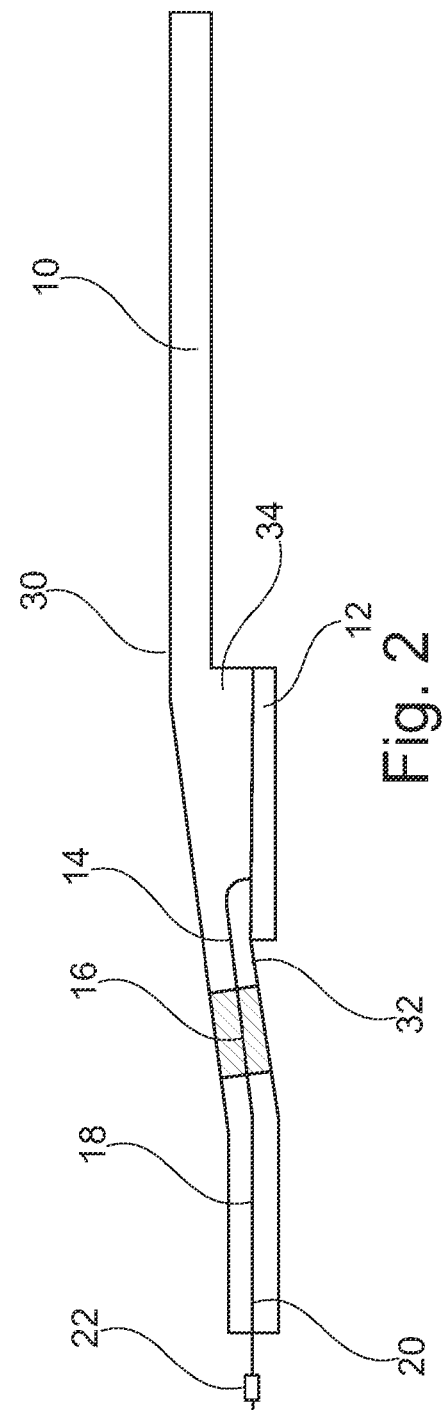

EQUIPMENT ELEMENT WITH RETRACTABLE LINE

CROSS-REFERENCE TO RELATED APPLICATIONS

This application claims the benefit of the filing date of German Patent Application No. 10 2009 018 771.5 filed Apr. 24, 2009 and of U.S. Provisional Patent Application No. 61/172,351 filed Apr. 24, 2009, the disclosures of which applications are hereby incorporated herein by reference

TECHNICAL FIELD

The invention relates to the interior equipment of transportation means. In particular, the invention relates to an equipment element for a transportation means with an arrangement of lines for connecting the equipment element with the wiring system of the transportation means. The invention also relates to a method for installing an equipment element, and an aircraft with an equipment element.

BACKGROUND

Equipment elements, such as separating walls, kitchen monuments or toilet monuments, often contain electrical equipment, such as monitors, exit signs, toilet occupied signs, but also non-electrical equipment, such as sinks or toilets requiring fluids like water. This equipment may have to be attached to the wiring system of the transportation means during installation.

While the interface or connection of the transportation means for the respective connection of the equipment element may be roughly determined in the initial construction phase of a transportation means, the position of the interface or connection may change during the ensuing construction phases. For this reason, the lines between the equipment element and interface or connection may have to be longer than would actually be required, which may add to the weight and may lead to complicated suspension devices for the lines.

If the line between the equipment element and the interface or connection of the aircraft is too short, either the position of the interface or connection in the transportation means may have to be changed, or the line may have to be lengthened, which may result in a high adjustment outlay.

DE 10 2004 044 944 B3 and US 2008/034630 A1 disclose an illuminated ceiling paneling for an aircraft, which can be connected with a power source via an electrical line.

SUMMARY

To this end, an embodiment of the invention may provide an equipment element for a transportation means. The equipment element may comprise a terminal device, a line arrangement for connecting the terminal device with a supply device of the transportation means, and a line retraction mechanism for setting the length of the line arrangement between the equipment element and the supply device.

The equipment element may comprise a retractable line, the length of which may be set by means of a retraction mechanism.

Thus, the outlay required for the equipping the interior of a transportation means may be reduced.

The equipment element may be a component for the interior space of the transportation means. The equipment element may be a monument, for example a galley or a toilet monument, a separating wall, a PSU module for a PSC or an airplane seat.

In the equipment element the cable length required for the installation of the equipment element in the airplane may be integrated, plus some length left over.

A line retraction mechanism may be used to set the line from the equipment element to the interface or connection of the airplane in such a way that the line traverses the shortest possible or the direct route from the equipment element to the interface or connection.

As a result, no excess lengths may have to be provided for the lines, which make it possible to save on weight. In addition, the right length of line for connection to the interface or connection may always be available. No mounts for securing the line to the transportation means may be necessary, since no loose loops of line are created by setting the length of the line arrangement, which would make it necessary to prevent the line arrangement from swinging around uncontrollably. Eliminating the necessity for mounts may enable a further savings in weight for the transportation means. The adjustment outlay required for lengthening a too short line may be saved.

Setting the length of the line arrangement may involve shortening and/or lengthening the line arrangement by retracting or extending the line. To this end, for example, the line arrangement may be sectionally rolled up or also be linearly refracted.

The equipment element may be connectable with at least one supply device. However, it may also be connectable with a plurality of supply devices.

In an embodiment, the equipment element may comprise a line guide for guiding the line arrangement when adjusting the length of the line arrangement. If the line arrangement is connected with the transportation means, the line arrangement may lead from the line guide to the interface, to the junction or connection between the line arrangement and transportation means. The line arrangement may be movably coupled with the line guide. If the line guide is rigidly secured to the equipment element, the line guide may establish a fixed reference point, which the line arrangement of the equipment element leads away from.

In an embodiment, the line retraction mechanism may be arranged between the line guide and the terminal device. The line arrangement may lead from the terminal device to the line retraction mechanism, and then from the line refraction mechanism to the line guide.

In an embodiment, one end of the line arrangement may be arranged at the line guide in a transport position, wherein the length of the line arrangement may be minimal between the end of the line arrangement and line guide in an installation position, in which the end of the line arrangement may be connected with the supply device. The fact that the line arrangement length is minimal may mean that the line arrangement is minimal by comparison with a line arrangement that is "loosely" suspended, and forms loops, for example. The line arrangement may not have to not run along the straight connecting line between the end of the line arrangement and the line guide, but may rather run along the minimal possible path, for example when the line arrangement is guided around a corner.

In the transport position, the line arrangement may be better protected against influences acting from outside than in a case where the line arrangement is only provisionally secured to the equipment element solely for transportation purposes. Further, the end of the line arrangement may not swing around uncontrollably in the transport position, since it is held in place by the line guide at a specific point.

According to an embodiment, the line arrangement may comprise a single line.

In an embodiment, the line arrangement may comprise several lines, which may also be used for different purposes. For example, electrical lines for power supply, hydraulic lines for supplying pressure to the equipment element, and fluid lines for supplying the equipment element with a fluid, such as oxygen, air or water.

In an embodiment, the terminal device may comprise an electrical device, and the line may comprise an electrical line. The supply device may be a power supply source of the transportation means. An electrical line may have several individual conductors, for example individual phases. In this case, the equipment element may comprise a lamp or may be an illuminated sign.

In an embodiment, the terminal device may comprise an information-processing device and the line may comprise a signal line. The supply device may be part of the information system or communication system of the transportation means, such as a computer. The signal line may be a fiberglass cable or coaxial cable. The terminal device may be a wireless transmitter or a wireless receiver, or also a computer arranged in the equipment element or a controller.

In an embodiment, the terminal device may comprise a fluid-consuming or fluid-dispensing device, and the line may comprise a fluid line. The line arrangement may comprise lines for gas, water, service water, gray water, or black water. The equipment element may be a toilet monument or a galley. These lines may be connected with a water supply system, with a wastewater system or compressed air system of the transportation means. The supply device may be a tank, for example.

In an embodiment of the invention, the line arrangement may have at least two lines, wherein the line retraction mechanism may have a single line retraction mechanism for each of the at least two lines.

Each of the single line mechanisms may be adapted to adjust the length of the respective line between the equipment element and supply device separately or independently of the other single retraction mechanisms. For example, electrical lines and signal lines may be combined for the line arrangement, for example for a controller or a computer. It may be also possible to combine electrical lines and fluid lines, like for example a water line, for a galley or kitchen monument. When using lines serving different purposes, separately operating line retraction mechanisms may be adjusted to the respective properties of the lines.

In an embodiment, the equipment element may comprise a plug at the end of the line arrangement, wherein the plug can be retracted up to the line guide via the line arrangement using the line retraction mechanism.

On the one hand, a plug may make it possible to decrease the outlay involved in connecting the line arrangement with the supply systems of the transportation means. On the other hand, a plug may prevent the line arrangement from being retracted beyond the line guide by the line retraction mechanism. The plug may comprise a plurality of individual plugs for the lines of the line arrangement.

In an embodiment, the equipment element may comprise a combination plug at the end of the line arrangement, wherein the combination plug may be designed as an integrally formed component. The combination plug may have an individual plug for each of the at least two lines. The terminal device or terminal devices of the equipment element may be connected with the transportation means in a single operation.

In an embodiment, the combination plug may be connected with a combination socket of the transportation means, wherein the at least two lines may be connected with at least two supply devices by connecting the combination plug with the combination socket. It has to be understood that the terms "plug" and "socket" may be interchangeable with each other. Plugs and sockets may each comprise a male plug and/or female plug, or vice versa.

In an embodiment, the equipment element may have a cavity, wherein the line retraction mechanism may be arranged in the cavity of the equipment element. The cavity may be surrounded by walls of the equipment element.

A cavities inside the equipment element may be used x for protecting the line retraction mechanism and the line arrangement at the same time.

In an embodiment, the cavity may be bordered by a wall of the equipment element, wherein the line guide may comprise an opening in the wall, and the line arrangement may be arranged in the cavity of the equipment element in the transport position. It may be the case that only the end of the line arrangement may project out of the equipment element in the transport position, or that in the transport position the line arrangement may be arranged in the cavity of the equipment element except the end of the line arrangement.

In this way, the line arrangement may be protected by the equipment element while transporting the equipment element to the installation site in the transportation means.

In an embodiment, the plug or combination plug at the end of the line arrangement may be formed in such a way that the cable cannot disappear in the cavity or the interior of the equipment element when the line arrangement is retracted by the line retraction mechanism. As a result, the line arrangement and line retraction mechanism may be installed without the danger of the line retraction mechanism retracting the line arrangement so far inside the equipment element that it can no longer be accessed when installing the equipment element in the transportation means.

In another embodiment, the line retraction mechanism may comprise an energy storage mechanism, wherein mechanical energy may be storable in the energy storage mechanism while extending the line arrangement, for example, wherein the energy may be released from the energy storage mechanism to retract the line arrangement.

When the line arrangement is extended by a person, for example by someone who extracts the line arrangement from the equipment element during installation of the equipment element in the transportation means, energy may be stored in the energy storage mechanism, which may again be released while retracting the line arrangement via the line retraction mechanism, so that the line of the line retraction mechanism may be automatically retracted. In an installation position or in a position where the line is partially extended from the equipment element, the line arrangement may be placed under a mechanical stress by the energy storage mechanism. The mechanical stress may be used to shorten the line arrangement, so as to set the minimal length of the line between the line guide and supply device.

In an embodiment, the energy storage mechanism may be a spring arrangement or spring.

The invention also relates to a method for installing an equipment element. According to an embodiment, the method may comprise the steps: Securing the equipment element to the transportation means; withdrawing the line arrangement until the end of the line arrangement is connectable with the end of a line with the supply device; attaching the terminal device by connecting the end of the line arrangement with an end of the line to the supply device; shortening the line arrangement to a minimal length by retracting the line arrangement via the line retraction mechanism.

This may make it possible to significantly reduce the work required to install an equipment element in a transportation means. In an embodiment, the terminal device may be connected via a plug or the combination plug at the end of the line arrangement with a receptacle at the end of a line to the supply device.

In an embodiment, the method may also comprise the following steps: Separating the terminal device from the airplane by detaching the line arrangement, stowing the line arrangement by retracting the line arrangement via the line retraction mechanism; disconnecting the equipment element from the transportation means.

This may also make it possible to reduce the work required for de-installing the equipment element. The line arrangement may be protected inside the equipment element while the equipment element is temporarily stored and during transport to the next installation site.

According to an embodiment, the disconnection of the terminal device may comprise detaching a plug from a receptacle of the transportation means. The line arrangement may be retracted up until its end or up to the plug when stowing the line arrangement.

In an embodiment of the invention, extending the line arrangement may comprise a storing of energy in an energy storage mechanism, and retracting the line arrangement may comprise a releasing of energy via the energy storage mechanism. For example, the energy storage mechanism may store energy in the form of mechanical energy, and may facilitate the retraction of the line arrangement inside the equipment element.

The embodiments of the invention may also relate to the use of an equipment element according to the invention in an aircraft, for example an airplane, a zeppelin or a helicopter.

The embodiments of the invention also relates to an aircraft with the equipment element according to the invention.

BRIEF DESCRIPTION OF THE DRAWINGS

FIG. 1 shows a longitudinal section through a curtain top section, which is also called header panel or curtain header, according to an exemplary embodiment of the invention;

FIG. 2 shows a top view of a cross section through the curtain header from FIG. 1;

DETAILED DESCRIPTION

Figure 3:
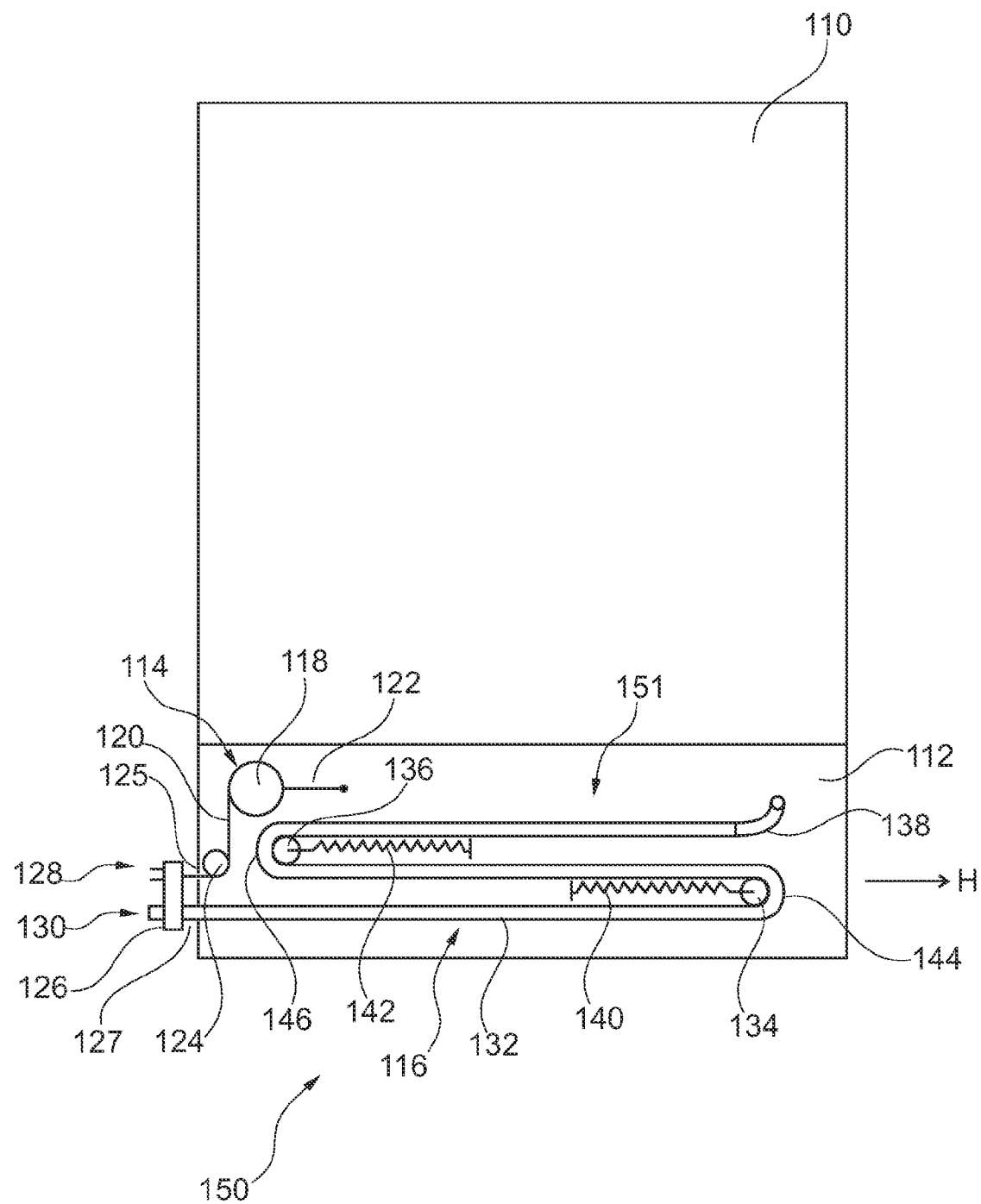
FIG. 3 shows a diagrammatic longitudinal section through a monument according to an exemplary embodiment of the invention.

The following detailed description is merely exemplary in nature and is not intended to limit application and uses. Furthermore, there is no intention to be bound by any theory presented in the preceding background or summary or the following detailed description.

FIG. 1 shows a partially longitudinal section through an equipment element 10 in the form of a curtain header. An illuminated sign 12 is secured to a lateral wall 32 of the curtain header 10. The sign 12, which can be illuminated by incandescent lamps or LED's, for example, is connected by an electrical line 14 with a line retraction mechanism 16. The line retraction mechanism 16 is a spring-loaded cable take-up reel, which can retract a line arrangement 18 in the form of an electrical line. The electrical line 18 exits the curtain header 10 through an opening 20. A plug 22 is located at the end of the electrical line 18.

The electrical line 18 is partially reeled onto a drum 24 of the retraction mechanism 16. The end of the electrical line 18 for the drum 24 is electrically connected with the line 14. If the plug 22 is connected with a power supply system of a transportation means, for example an aircraft, the sign 12 is supplied with power via the lines 14 and 18.

If a person pulls on the end of the line 18 in the area of the plug 22, the drum 24 turns, and the line 18 is unreeled from the drum 24. The drum 24 is connected with a spring, which is tensioned while unreeling the line 18, accumulating mechanical energy. If the end of the line 18 with the plug 22 is loose, meaning no longer connected with a socket, the tensioned spring causes the drum 24 to turn and to retract the line 18 into the equipment element 10. The opening 20 guides the line 18 inside the equipment element 10.

FIG. 2 shows a top view of a cross section through the curtain header 10. As evident from FIG. 2, the curtain header 10 comprises two lateral walls 30 and 32. A sign 12 is secured to the lateral wall 32. A cavity 34 is formed between the two lateral walls 30 and 32, and incorporates the electrical line 14, the line refraction mechanism 16 and a section of the line 18.

FIG. 3 shows a diagrammatic longitudinal section through a monument 110 of a transportation means. The lower area of the monument 110 is provided with a cavity 112, in which two line refraction mechanisms 114 and 116 are provided. Similarly to FIG. 1 and FIG. 2, the line retraction mechanism 114 is a spring-loaded cable take-up reel 118, which can retract an electrical line 120 into the interior 112 of the monument 110. The electrical line 120 is electrically connected with an electrical line 122, to which the electrical consumers, for example a lamp, controller or computer within the monument 110 are attached. A deflection roller 124 guides the line 120 through an opening 125 in a lateral wall of the monument 110. The end of the line 118 is connected with a combination plug 126. In addition to an electrical plug element 128, the combination plug 126 designed as an integral component has a plug element 130 for a fluid line 132.

The line 122 may also comprise a signal line, with which a computer inside the monument is connected.

The fluid line 132, which can be a freshwater line, for example, may be a flexible tube, for example a rubber hose. The line 132 runs through an opening 127 in a lateral wall of the monument 110 into the interior of the monument 110. The line 132 then runs in a first loop 144 around a first deflection roller 134 and in a second loop 146 around as second deflection roller 136 until it reaches a connecting pipe 138, through which the terminal devices inside the monument 110 may be supplied with water, for example a washbasin or toilet. The first roller 134 and second roller 136 are guided in direction H on the monument 110, and movably secured to the monument 110 in direction H. To this end, the rollers 134 and 136 are attached to one end of a spring 140 or a spring 142, the other ends of which are fixedly or rigidly secured to the monument 110. If the combination plug 116 is moved away form the monument opposite the arrow H, the springs 140 and 142 are compressed by the shortening of the fluid line 132, and absorb mechanical energy.

If the combination plug 126 is released, the spring 140 presses the loop 144 of the fluid line 132 in direction H, and the spring 142 presses the loop 146 of the fluid line 132 against direction H, thereby lengthening the section of the fluid line 132 inside the casing. In this way, the section of the fluid line 132 outside the monument 110 is again retracted into the cavity 112 of the monument 110.

Pulling the combination plug 126 against direction H and away from monument 110 also lengthens the section of the electrical line 120 outside of the monument 10. The electrical line 120 is here deflected by the roller 124 and unreeled from the cable reel 118. Unreeling the electrical line 120 from the roller 118 tensions a spring that stores mechanical energy, and as the combination plug 126 moves on the monument 110 to the section of the electrical line 120 outside the monument 110, retracts inside the cavity 112, in which the roller 118 winds up a portion of the electrical line 120.

The retraction mechanisms 116 and 114 may be regarded as individual retraction mechanisms, which together form a retraction mechanism 151 for a line arrangement comprised of lines 120 and 132. The line arrangement 120, 132 is guided out of the openings 125 and 127 via a line guide.

Figure 4:
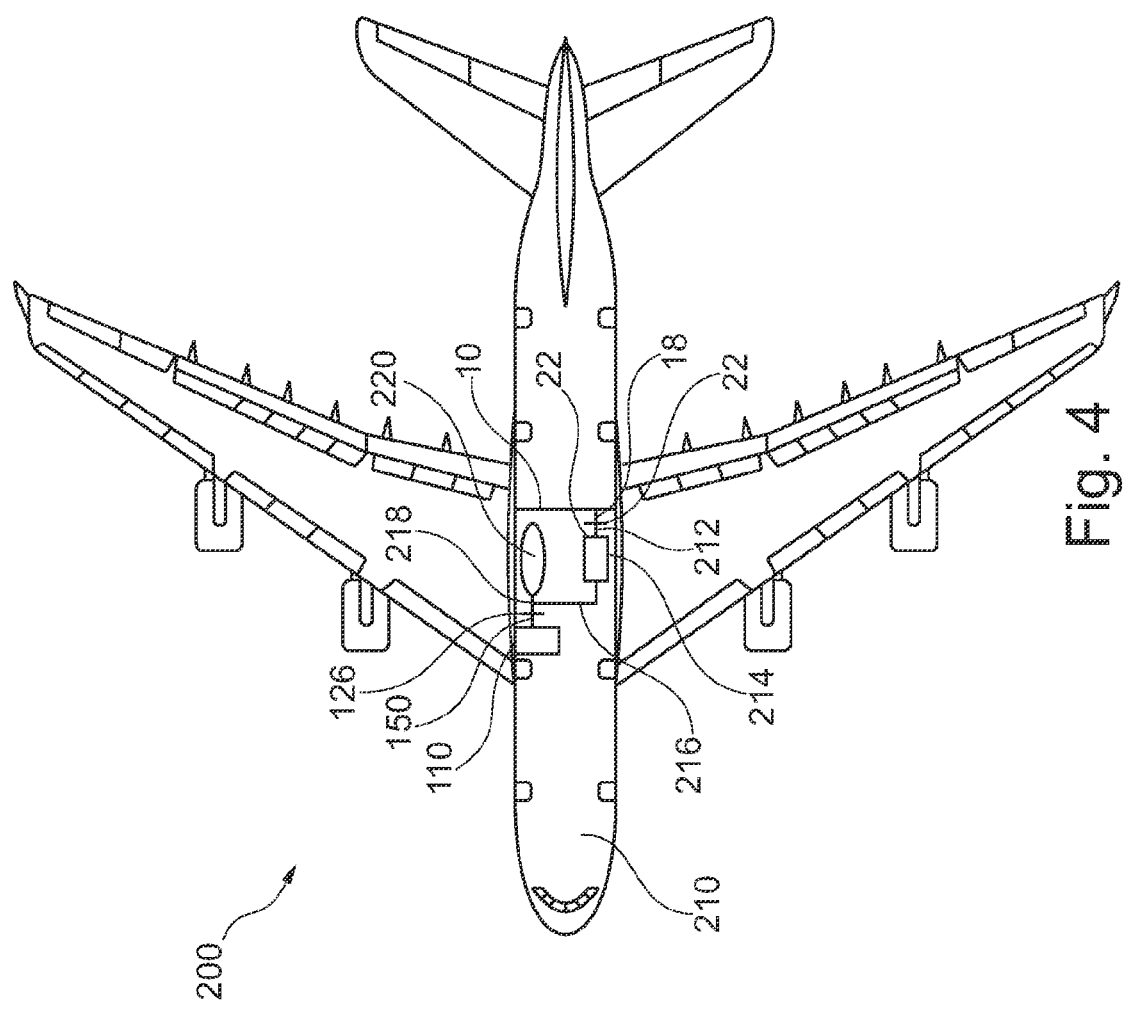
FIG. 4 shows a diagrammatic top view of an airplane with equipment elements according to an exemplary embodiment of the invention.

FIG. 4 shows a diagrammatic, top view of a transportation means or airplane 200. The curtain header 10 and monument 110 are secured and installed in a cabin 210 of the airplane 200. The curtain header 10 is connected with the plug 22 with an electrical line 212 to a supply device 214 of the airplane 200. The combination plug 126 of the line arrangement 150 comprised of lines 120 and 132 connects the monument 110 with the supply device 214 by way of an electrical line 216 on the one hand, and with a tank 220 of the transportation means 200, for example a water tank, by way of a fluid line 218, for example a water line.

Figure 5:
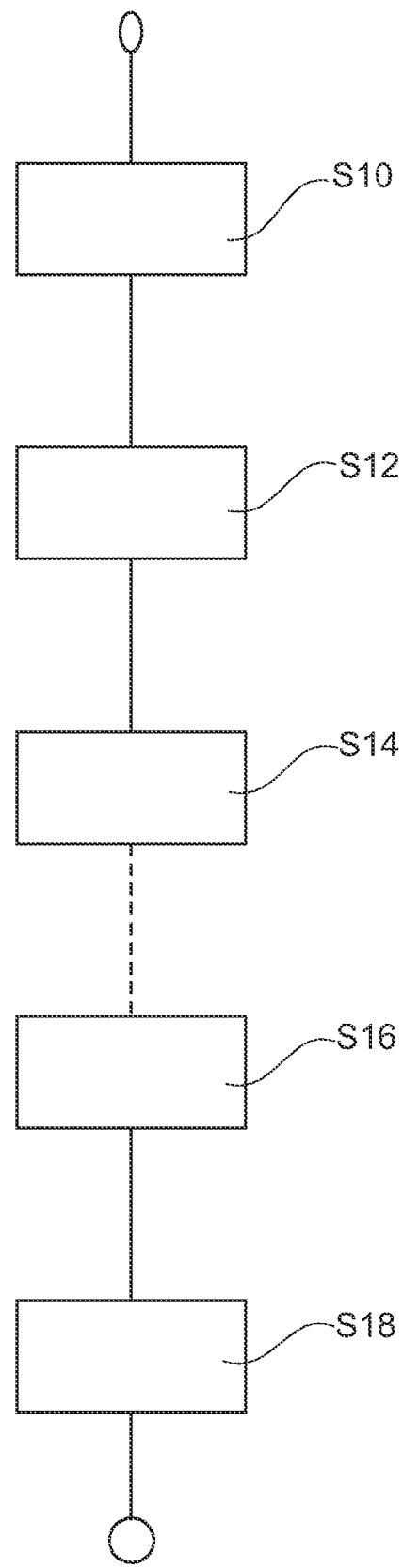
FIG. 5 shows a flow diagram for a method of installing an equipment element according to an exemplary embodiment of the invention.

FIG. 5 shows a flowchart for a method to install the equipment elements 10 and 110 in the airplane 200.

In step S10, the curtain header 10 and monument 110 are secured in the cabin 210. In step S12, the electrical line 18 or line arrangement 150 is withdrawn from the equipment elements 10, 110 to a point where the plugs 22, 126 can be connected with the ends of the lines 212 or 216 and 218.

In step S14, the plugs 22, 126 are inserted into the respective socket at the end of the lines 212 or 216, 218, and the illuminated sign 12 or terminal devices in the monument 110 are connected with the supply device 214 and tank 220.

The equipment elements 10, 110 are now completely installed in the airplane.

If the airplane is to be retrofitted, in a step S16 the plugs 22, 126 are detached, and the individual mechanisms 16 or 151 retract the line 18 or line arrangement 150 in a transport position. In step S18, the equipment elements 10, 110 are detached from the airplane 200, and the two equipment elements 10, 110 can be transported away.

In addition it has to be understood that "comprising" does not preclude any other elements or steps, and "an" or "a" do not rule out a plurality. Let it further be noted that features of steps described with reference to one of the above exemplary embodiments may also be used in combination with other features or steps of other exemplary embodiments described above. Reference numbers in the claims are not to be construed as a limitation. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An equipment element for an aircraft, comprising:
    a plurality of walls;
    a cavity surrounded by the plurality of walls;
    a terminal device secured to a wall of the plurality of walls;
    a line arrangement connecting the terminal device with a supply device of the transportation means and arranged inside the cavity of the equipment element in a transport position;
    a line retraction mechanism arranged in the cavity of the equipment element and adapted to set a length of the line arrangement between the equipment element and the supply device; and
    a line guide comprising an opening in at least one of the plurality of walls that is adapted to guide the line arrangement while the length of the line arrangement is set,
    wherein the line retraction mechanism is arranged between the line guide and the terminal device.

2. The equipment element of claim 1,
    wherein one end of the line arrangement is arranged at the line guide in the transport position; and
    wherein the length of the line arrangement between an end of the line arrangement and the line guide is minimal in an installation position, in which the end of the line arrangement is connected with the supply device.

3. The equipment element of claim 1, wherein the terminal device comprises an electrical device and the line arrangement comprises an electrical line.

4. The equipment element of claim 1, wherein the terminal device comprises an information-processing device and the line arrangement comprises a signal line.

5. The equipment element of claim 1, wherein the terminal device comprises a fluid-consuming device and the line arrangement comprises fluid lines.

6. The equipment element of claim 1, wherein the line arrangement comprises at least two lines and the line retraction mechanism for each of the at least two lines comprises a single line retraction mechanism.

7. The equipment element of claim 1, wherein the line retraction mechanism comprises an energy storage mechanism that is adapted to store energy when retracting the line arrangement and release the energy stored the energy storage mechanism.

8. The equipment element of claim 7, wherein the energy storage mechanism is a spring arrangement.

9. A method for installing an equipment element in an aircraft comprising:
    arranging, in a transport position, a line arrangement of the equipment element inside a cavity of the equipment element, the cavity being surrounded by walls of the equipment element, the equipment element including a terminal device secured to one of the walls;
    securing the equipment element to the transportation means;
    withdrawing the line arrangement from the cavity until an end of the line arrangement can be connected with an end of a line with a supply device;
    guiding the line arrangement with a line guide while setting a length of the line arrangement, the line guide comprising an opening in one of the walls, the opening guiding the line arrangement;

attaching the terminal device of the equipment element by connecting the end of the line arrangement with the end of the line to the supply device; and shortening the line arrangement to a minimal length by retracting the line arrangement via a line retraction mechanism inside the cavity, the line retraction mechanism being arranged between the line guide and the terminal device.

10. The method of claim 9, further comprising:

disconnecting the terminal device from the transportation means by detaching the line arrangement;

stowing the line arrangement in the cavity by retracting the line arrangement via the line retraction mechanism; and separating the equipment element from the transportation means.

11. The method of claim 9, wherein extending the line arrangement comprises storing energy in an energy storage mechanism and retracting the line arrangement comprises releasing of the energy with the energy storage mechanism.

12. An aircraft, comprising:

an equipment element comprising:

a plurality of walls;

a cavity surrounded by the plurality of walls;

a terminal device secured to a wall of the plurality of walls;

a line arrangement connecting the terminal device with a supply device of the aircraft and arranged inside the cavity of the equipment element in a transport position;

a line retraction mechanism arranged in the cavity of the equipment element and adapted to set a length of the line arrangement between the equipment element and the supply device; and a line guide comprising an opening in at least one of the plurality of walls that is adapted to guide the line arrangement while the length of the line arrangement is set, wherein the line retraction mechanism is arranged between the line guide and the terminal device.

13. The aircraft of claim 12, wherein, in an installation position, in which an end of the line arrangement is connected with the supply device of the aircraft, the length of the line arrangement between the line guide and the supply device is shortened, since the line arrangement is placed under mechanical stress by the line retraction mechanism.

14. The aircraft of claim 13, wherein one end of the line arrangement is arranged at the line guide in the transport position; and wherein the length of the line arrangement between the end of the line arrangement and the line guide is minimal in the installation position, in which the end of the line arrangement is connected with the supply device.

15. The aircraft of claim 13, wherein the terminal device comprises an electrical device and the line arrangement comprises an electrical line.

16. The aircraft of claim 13, wherein the terminal device comprises an information-processing device and the line arrangement comprises a signal line.

17. The aircraft of claim 13, wherein the terminal device comprises a fluid-consuming device and the line arrangement comprises fluid lines.

18. The aircraft of claim 13, wherein the line arrangement comprises at least two lines and the line retraction mechanism for each of the at least two lines comprises a single line retraction mechanism.

19. The aircraft of claim 13, wherein the line retraction mechanism comprises an energy storage mechanism that is adapted to store energy when retracting the line arrangement and release the energy stored the energy storage mechanism.

20. The aircraft of claim 19, wherein the energy storage mechanism is a spring arrangement.

* * * * *

UNITED STATES PATENT AND TRADEMARK OFFICE
CERTIFICATE OF CORRECTION

PATENT NO. : 8,297,553 B2
APPLICATION NO. : 12/764802
DATED : October 30, 2012
INVENTOR(S) : Jovan Ulbrich-Gasparevic et al.

Page 1 of 1

It is certified that error appears in the above-identified patent and that said Letters Patent is hereby corrected as shown below:

On the Title page

Item (30) Foreign Application Priority Data, "Apr. 29, 2009," should be changed to --Apr. 24, 2009--

Signed and Sealed this
Sixth Day of August, 2013

Teresa Stanek Rea
*Acting Director of the United States Patent and Trademark Office*